United States Patent [19]

Johnson et al.

[11] Patent Number: 4,991,283

[45] Date of Patent: Feb. 12, 1991

[54] SENSOR ELEMENTS IN MULTILAYER CERAMIC TAPE STRUCTURES

[76] Inventors: Gary W. Johnson, 14351 Miro Ct., Irvine, Calif. 92714; William A. Vitriol, 1505 W. Rene Dr., Anaheim, Calif. 92802

[21] Appl. No.: 441,589

[22] Filed: Nov. 27, 1989

[51] Int. Cl.⁵ .............................................. G01R 3/00
[52] U.S. Cl. ........................................ 29/595; 264/61
[58] Field of Search ................... 73/777, 780, 862.64, 73/754, 862.68; 357/25, 26; 29/594, 595; 264/61

[56] References Cited

U.S. PATENT DOCUMENTS 4,665,610  5/1987  Barth ............................... 73/777 X
4,894,635  1/1990  Yajima et al. ...................... 264/61 X

OTHER PUBLICATIONS

Ettre, K. et al., Pressure-Fusible Tapes . . . Structures, Ceramic Bulletin, vol. 51, No. 5, 1972, pp. 482-485.

*Primary Examiner*—Jerry W. Myracle
*Attorney, Agent, or Firm*—Terje Gudmestad; W. K. Denson-Low

[57] ABSTRACT

A structure formed of a plurality of sheets which are laminated and fused together includes at least one sintered ceramic sheet formed from thermally fusible tape. A sensor element, such as a cantilever, circular diaphragm, rectangular diaphragm supported at least two sides, or microbridge, is formed as a part of the ceramic sheet. A hole may be formed through one of the sheets adjacent to the ceramic sheet to expose the sensor element to an ambient environment which is to be sensed. Electrical signals corresponding to a physical change in the sensor element such as stress or displacement are generated by piezoresistor, variable capacitor, photodetector, or the like attached to or formed on the sensor element, which is interconnected with a metallization pattern formed on at least one of the sheets. The thickness of the sheets is highly uniform, thereby producing sensor elements with precisely reproducible thicknesses and mechanical properties.

27 Claims, 6 Drawing Sheets

SENSOR ELEMENTS IN MULTILAYER CERAMIC TAPE STRUCTURES

BACKGROUND OF THE INVENTION

1. Field of the Invention

The present invention generally relates to the art of microelectronics, and more specifically to a multilayer ceramic tape structure having sensor elements formed therein.

2. Description of the Related Art

Techniques have been developed for integrating sensors to measure force or pressure, acceleration, temperature, position or displacement, ion (ph) and gas concentrations, magnetic field strength, radiation levels, etc., into a monolithic structure with signal processing electronics. An integrated device can be made much smaller, lighter, and cheaper than a package including a separate sensor and its associated components, and is potentially more reliable.

Such integrated sensor packages are being used extensively, for example, in the automotive industry, in applications involving electronic controls to optimize fuel economy and engine operation, meet emission control requirements, and provide more comfortable and/or safe driving characteristics. Assemblies using such sensors include antilocking and/or antiskid braking systems, positive traction systems, suspension adjustment systems, and the like.

The two main prior art types of integration include micromachining of silicon, and thick film processing. A general description of these technologies is found in an article entitled "New Advances in Sensor Technology", by L. Teschler, Machine Design, Dec. 6, 1984, pp. 118–124.

Micromachining uses the same photolithographic and chemical processes as conventional integrated circuit fabrication. Doping dependent anisotropic chemical etching is a major micromachining method. However, devices have been fabricated using dry etching techniques utilizing plasma and reactive ion beams. Possible structural permutations include grooves, free-standing pillars, cantilevered beams, membranes of various thicknesses with and without integral pores, microbridges, and various shapes of holes. A detailed discussion of sensor structures fabricated by micromachining of silicon is found in an article entitled "Silicon Micromechanical Devices", by J. Angell et.al, Scientific American, Apr. 1983, pp. 4455. An example of a multi-dimensional accelerometer formed by micromachining of silicon is found in U.S. Pat. No. 4,809,552, issued Mar. 7, 1989, entitled "MULTIDIRECTIONAL FORCE-SENSING TRANSDUCER", to G. Johnson.

Although advantageous in many respects, micromachining of silicon is a relatively complex and expensive process, and is limited in the configurations of sensor shapes that can be formed.

Fabrication of multilayer electronic structures for hybrid microcircuit technology and other applications includes the thick film process referenced above wherein individual conductor and dielectric compositions in paste form are sequentially deposited on insulating substrates and then fired, one layer of material at a time, in order to build up a thick film, multilayer circuit. Sensors responsive to pressure, stress, displacement, etc., have been fabricated using the thick film process by exploiting the piezoresistive effect in thick film resistors. Such resistors are formed on mechanical sensor elements such as cantilevers and diaphragms, and transduce mechanical strains into electrical signals. An article describing this technology is found in "THICK-FILM PRESSURE SENSORS: PERFORMANCES AND PRACTICAL APPLICATIONS", by R. Dell-'Acqua et.al, Third European Hybrid Microelectronics Conference Proceedings, Avignon, 1981.

The major problem inherent in the thick film process is that thickness control is difficult in the formation and machining of fired ceramic layers. This imposes a serious limitation on the accuracy attainable with sensors formed by this process.

An improved method for the fabrication of hybrid microcircuits which forms a basis for the present invention is the cofired ceramic process. This technology utilizes dielectric material formed into sheets having alumina as a main component. These insulating sheets are then either metallized to make a ground plane, signal plane, bonding plane, or the like, or they are formed with via holes and back filled with metallization to form interconnect layers. Individual sheets of tape are then stacked on each other, laminated together using a predetermined temperature and pressure, and then fired at a desired elevated temperature at which the material fuses or sinters. Where alumina is chosen for the insulating material, tungsten, molybdenum or molymanganese is typically used for metallization, and the part is fired to about 1,600° C. in an $H_2$ reducing atmosphere.

The undesirable high processing temperature and requisite $H_2$ atmosphere of the refractory metals has led to the development of Low-Temperature-Cofired-Ceramic (LTCC) tape. LTCCs are under development and/or commercially available from a number of manufacturers including ElectroScience Laboratories, Inc., of Prussia, Pa., EMCA, of Montgomeryville, Pa., and FERRO, of Santa Barbara, Calif. A preferred LTCC material, which is known in the art as "green tape", is commercially available from the DuPont under the product designation #851AT. The tape contains a material formulation which can be a mixture of glass and ceramic fillers which sinter at about 850° C., and exhibits thermal expansion similar to alumina.

The low-temperature processing permits the use of air fired resistors and precious metal thick film conductors such as gold, silver, or their alloys. In the typical high-temperature process, screen-printed resistors cannot be used and only refractory metal pastes are used as conductors.

A discussion of thick film technology, and high and low temperature cofired ceramic tape technology, is found in "DEVELOPMENT OF A LOW TEMPERATURE COFIRED MULTILAYER CERAMIC TECHNOLOGY", by William Vitriol et.al, ISHM Proceedings 1983, pp. 593–598.

One disadvantage of the cofired ceramic approach is that the dielectric film or tape will undergo shrinkage of as much as 20% in each of the X, Y, and Z directions. This shrinkage results in a dimensional uncertainty in the fired part of typically ~1%, which may be unacceptable in the fabrication of certain types of hybrid microcircuits.

Another multilayer circuit board fabrication technology which obviates the shrinkage problem inherent in the ceramic cofired tape process is disclosed in U.S. Pat. No. 4,645,552, issued Feb. 24, 1987, entitled "PROCESS FOR FABRICATING DIMENSIONALLY STABLE INTERCONNECT BOARDS", to William Vitriol et al. This process may be described as a "transfer-tape" method, and is performed by providing a generally rigid, conductive substrate, or an insulative substrate on which a conductive circuit pattern is formed, and then transferring and firing a glass-ceramic tape layer to the surface of the substrate. This tape layer provides electrical isolation between the substrate and electrical conductors or electronic components which are subsequently bonded to or mounted on the top surface of the glass-ceramic tape layer. By providing vertical electrical interconnects by means of vias formed in the tape layer prior to firing the tape layer directly on the substrate, X and Y lateral dimensional stability of the tape material is maintained. The next conductor layer in this vertical interconnect process is then screen printed on the fired tape dielectric and itself fired. This process is repeated until the hybrid circuit is built up to a desired vertical, multilayer interconnect level. As an alternative process to individually firing conductor and dielectric layers, the complete structure or portions thereof can be simultaneously fired as disclosed in the above referenced patent to Vitriol. By replacing a screen printed dielectric layer build-up process with a pre-punched dielectric tape layer, the transfer tape process retains the primary advantages of the thick film process, while gaining many advantages of the cofired ceramic process.

SUMMARY OF THE INVENTION

The present invention provides a method for forming a multilayer ceramic tape structure, and a structure fabricated by the method, preferably utilizing ceramic LTCC tape or transfer tape as described above, which advantageously incorporates a wide variety of sensors or transducers in the structure. The sensors include elements fabricated in ceramic tape as flexible membranes or members for the purpose of sensing force, pressure, acceleration, air flow, crash impact, etc. This is accomplished in accordance with the invention by utilizing the uniform thickness of the ceramic tape and its ability to be formed or cut into complex shapes to replace chemical or mechanical machining operations which have heretofore been used to fabricate diaphragms and other sensor elements. This ability to control the dimensions of the structures, particularly thickness, provides a substantial improvement in the reproducibility and accuracy of the sensors. It also enables integration of external electronics with sensors on one or both sides of the structure in a monolithic package, with substantially reduced parts count and process steps. The result is a smaller, less expensive, and more reliable sensor structure than has been possible using the micromachining and thick film processes discussed above.

In accordance with the present invention, a structure formed of a plurality of sheets which are laminated and fused together includes at least one sintered ceramic sheet formed from thermally fusible tape. A sensor element, such as a cantilever, circular diaphragm, rectangular diaphragm supported at least two sides, or microbridge, is formed as a part of the ceramic sheet. A hole may be formed through one of the sheets adjacent to the ceramic sheet to expose the sensor element to an ambient environment which is to be sensed. Electrical signals corresponding to a physical change in the sensor element such as stress or displacement are generated by a piezoresistor, variable capacitor, photodetector, or the like attached to or formed on the sensor element, which is interconnected with a metallization pattern formed on at least one of the sheets.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
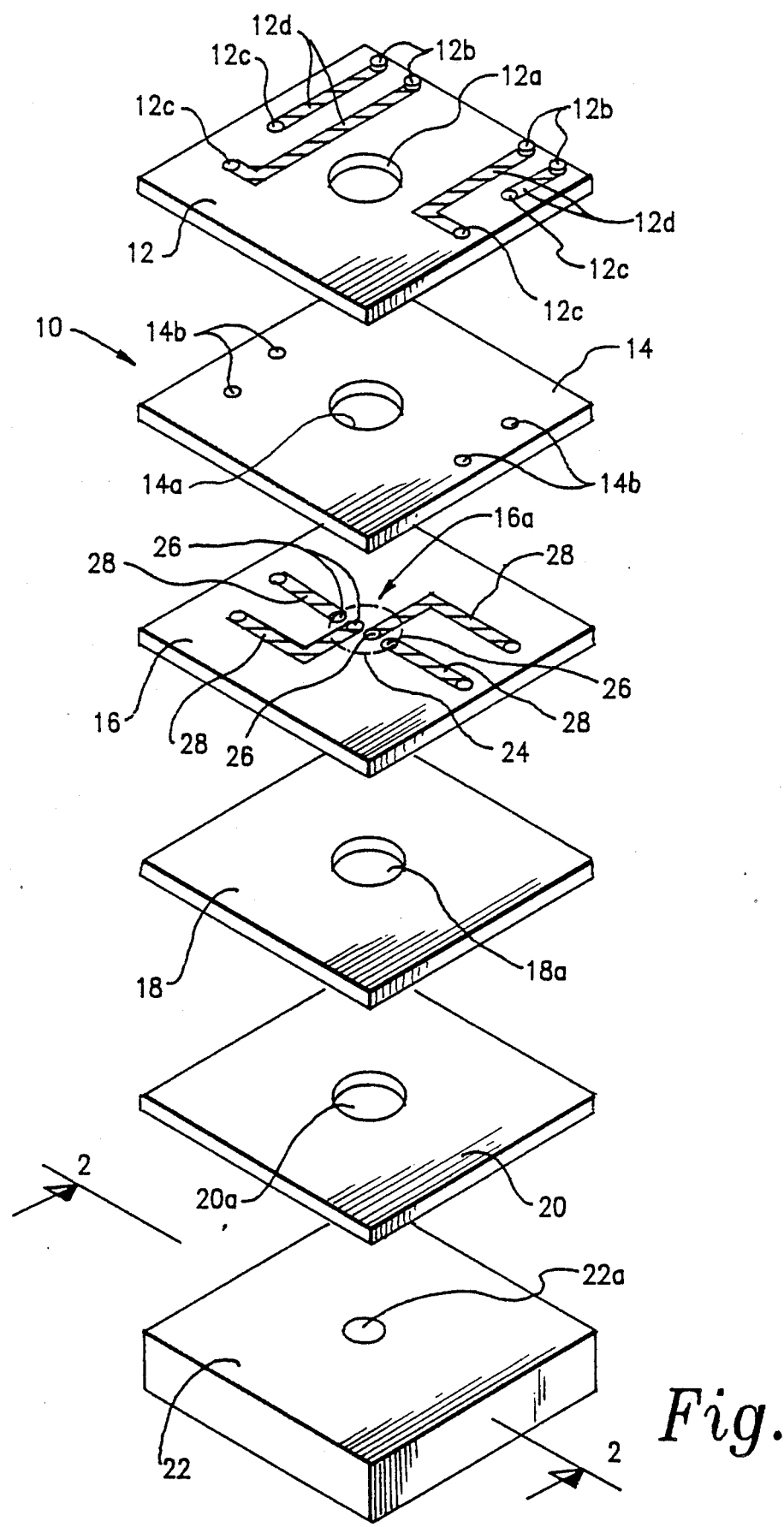
FIG. 1 is an exploded perspective view of a first embodiment of a multilayer ceramic tape structure incorporating a sensor element in accordance with the present invention.

Referring now to FIG. 1 of the drawing, a multilayer ceramic tape structure incorporating a sensor in accordance with the present invention is generally designated as 10 and includes sheets 12, 14, 16, 18, 20, and 22. Where the structure 10 is to be fabricated from transfer tape, the sheet 22 is a relatively rigid substrate made of an electrically insulative ceramic or glass-ceramic, by way of example. In this case, the layers 12 to 20 are formed from thermally fusible, ceramic transfer tape. Where the structure 10 is to be formed from glass-ceramic, thermally fusible LTCC tape, the sheet 22 does not constitute a necessary part of the structure and may be omitted, and the sheets 12 to 20 provided in the form of LTCC tape.

The present invention is not limited to LTCC or transfer tape, and may be embodied using any suitable thermally fusible tape which may be thermally transformed by the application of heat into a sintered ceramic sheet. Three types of such tape which are currently available include pure ceramic tape, glass-ceramic tape, and crystallizable glass tape (in which the glass is converted to ceramic by de-vitrification).

Figure 2:
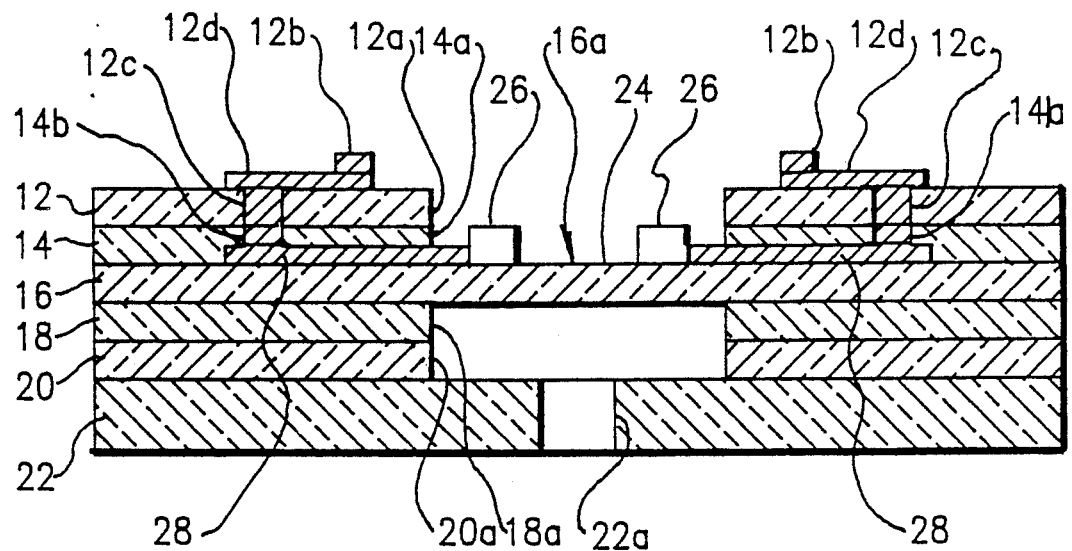
FIG. 2 is a section taken on a line II—II of FIG. 1.

The method or process of the present invention includes the steps of fabricating the individual sheets 12 to 22 as illustrated in FIG. 1, and laminating and thermally fusing the sheets together as shown in FIG. 2. Where the transfer tape alternative is to be used, the sheets 20 to 12 may be laminated and fused to the substrate 22 one sheet at a time, beginning with the sheet 20. Alternatively, the sheets 20 to 12 may be laminated together with the substrate 22 and heated to fusion in a single step.

Where LTCC is to be used, the substrate 22 is omitted, and the sheets 12 to 20 laminated together, and cofired to fusion in a single step. It will be understood that the scope of the invention includes lamination and firing of the sheets separately or in combination. In either case, the fusible ceramic tape is sintered during the heating or firing step, to form a unitary structure 10 as illustrated in FIG. 2.

In accordance with the embodiment of the present invention illustrated in FIGS. 1 and 2, circular holes 12a, 14a, 18a, 20a, and 22a are formed through the sheets 12, 14, 18, 20, and 22 respectively, in such a manner as to be aligned with each other, and with a circular part 16a of the sheet 16 when the sheets are laminated together. The hole 22a may be smaller than the respective holes in the other sheets. The circular part 16a of the sheet 16 constitutes a flexible or movable sensor element in the form of a circular diaphragm 24. As shown in FIG. 2, both sides of the diaphragm 24 are exposed to an ambient environment which is to be sensed through the holes.

In accordance with the present invention, at least one sensing or transducing means is associated with the movable sensor element to produce an electrical signal in accordance with a physical change in the sensor element. In the case of the sensor element being embodied by the diaphragm 24, an external force applied to the diaphragm 24 in the form of pressure, rate of flow, acceleration, etc. will create a deflection of the diaphragm 24, therefore inducing stress therein which results in strain according to Hooke's law.

The sensing or transducing means is designed to be responsive to a change in stress or displacement of the sensor element, and produce an electrical signal corresponding thereto. The sensing means may be attached to the sensor element at any point in the fabrication process after the sensor element is formed. Where the sensing means is in the form of a piezoresistor, for example, it would preferably be formed on the sensor element prior to lamination and firing of the sheets. Where the sensing element is in the form of a light emitting diode or other component which would be damaged by the temperature required to fuse the sheets, it would preferably be attached to the sensor element after the sheets have been laminated and fused together.

As shown in FIGS. 1 and 2, four sensing means in the form of piezoresistors 26 are formed on the sensor element 24, for producing electrical signals corresponding to induced stress in the diaphragm 24 in two dimensions. Although the four piezoresistors 26 are shown as being spaced along a diameter of the diaphragm 24, the invention is not so limited, and any number of piezoresistors may be provided at any respective positions on the sensor element.

The piezoresistors 26 are preferably applied to the sheet 16 in paste form by screen printing or the like prior to lamination of the sheets 12 to 22, and vary in resistivity as a function of induced stress. The piezoresistive effect per se, is well known in the art, and has been widely applied to the art of strain gauges. An example of applicable thick film resistor technology which may be adapted to form piezoresistors for embodying the present invention is disclosed in a paper entitled "THICK FILM RESISTOR STRAIN GAUGES: FIVE YEARS AFTER", by R. Dell'Acqua, IMC 1986 Proceedings, Kobe, May 28-30, pp. 343-351.

A metallization pattern is formed on the sheet 16 which interconnects with the piezoresistors 26 and, although not illustrated, further preferably interconnects with signal processing and any other desired circuitry formed on any or all of the sheets 12 to 22. In the illustrated embodiment, the metallization pattern includes strips 28 which interconnect with respective contact pads 12b formed on the peripheral surface of the sheet 12, through electrically conductive vias 14b extending through the sheet 14, and vias 12c extending through the sheet 12. The sheet 12 is further provided with electrically conductive strips 12d connecting the vias 12c to the contact pads 12b.

The contact pads 12b are provided for connecting the structure 10 to external circuitry (not shown). Although the contact pads 12b are shown as being connected directly to the piezoresistors 26, they are preferably connected indirectly thereto through signal processing circuitry (not shown) provided in a single layer or multilayer arrangement on any of the sheets 12 to 22. Although the sensing or transducing means are illustrated as being piezoresistors 26, the invention is not so limited. The sensing elements may be provided in any form which senses a physical change, including a chemical or electrical change, in the sensor element 24.

Although the structure 10 is illustrated as including five tape layers 12 to 20 and a substrate 22, the present invention may be embodied using any number of tape layers, with a sensor element being formed in at least one of the layers. The sensor element may be directly exposed to the environment by means of holes formed through tape layers laminated to one or both sides of the layer in which sensor element is formed. Alternatively, the sensor element may be hermetically sealed in applications such as accelerometers or radiation detectors where exposure to the environment is not necessary or especially desirable. It is further within the scope of the invention to attach sensing means to a sensor element using any appropriate means other than application in paste form and firing.

Figure 3:
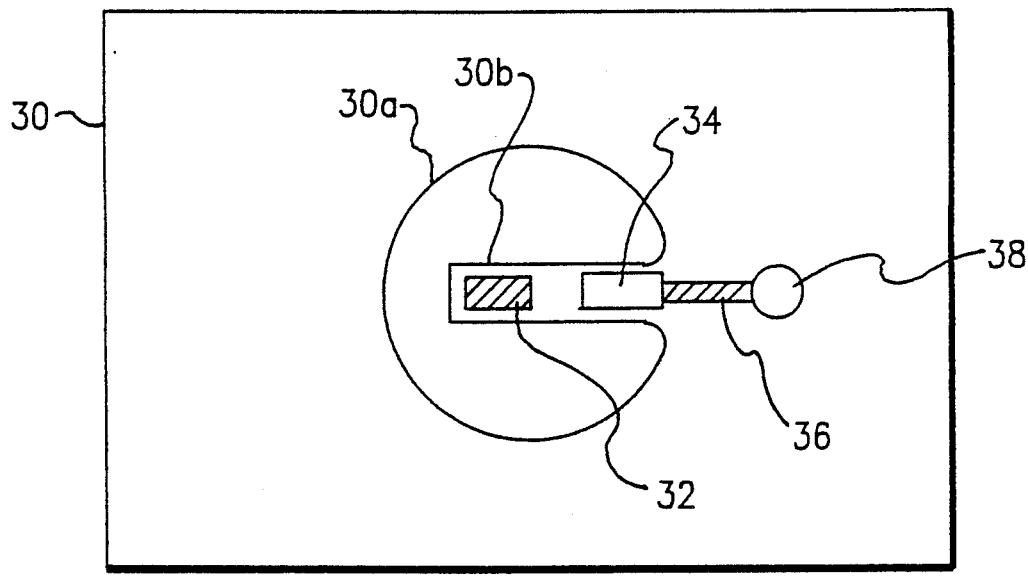
FIG. 3 is a plan view illustrating an alternative sensor element configuration embodying the invention.

FIG. 3 illustrates an alternative sensor element in the form of a cantilever. More specifically, a tape sheet 30 has a generally circular hole 30a formed therethrough. The portion of the sheet 30 disposed rightwardly of the hole 30a is shaped to extend into the hole 30a to constitute a cantilever beam 30b. The desired shape may be cut by mechanical shearing, laser cutting, or any other appropriate means. If desired, the moment of inertia of the beam 30b may be increased by providing a metal weight 32 thereon, such as by screen printing. A piezoresistor 34 or other sensing means is formed on the beam 30b near the point where the beam 30b extends from the sheet 30 into the hole 30a, where the induced stress is maximum. A metallization strip 36 connects the piezoresistor 34 to a via 38, for interconnection with a metallization pattern on another layer (not shown) of a structure incorporating the sheet 30 as one layer thereof.

The cantilever beam 30b will be displaced, thereby varying the stress in the piezoresistor 34 and the electrical resistivity thereof, in response to an applied force, such as pressure or acceleration.

Figure 4:
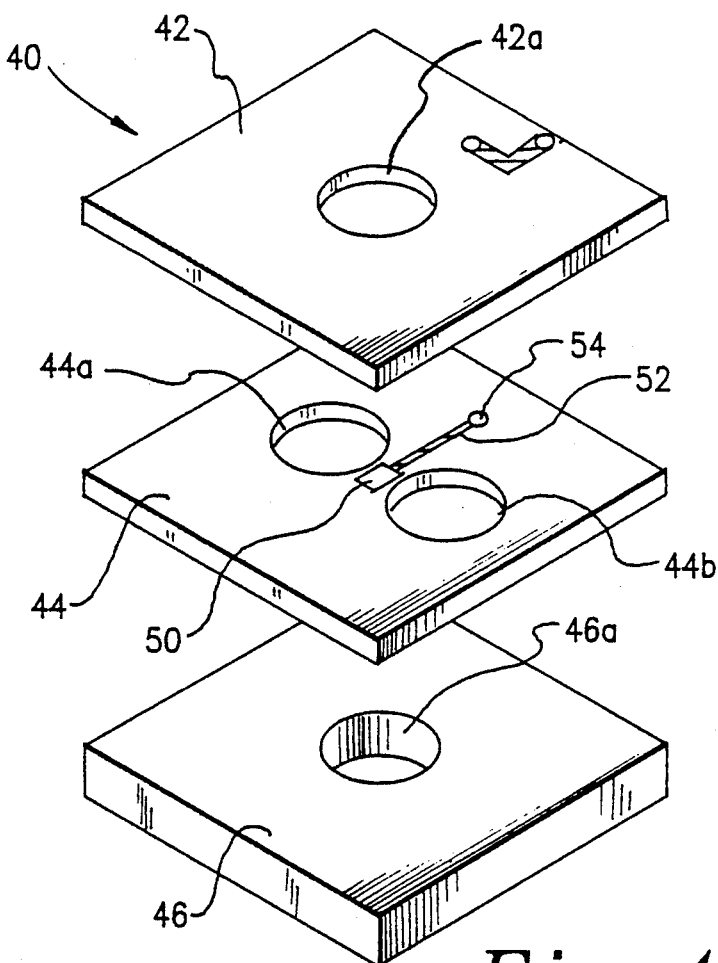
FIG. 4 is an exploded perspective view illustrating another structure embodying the invention.
Figure 5:
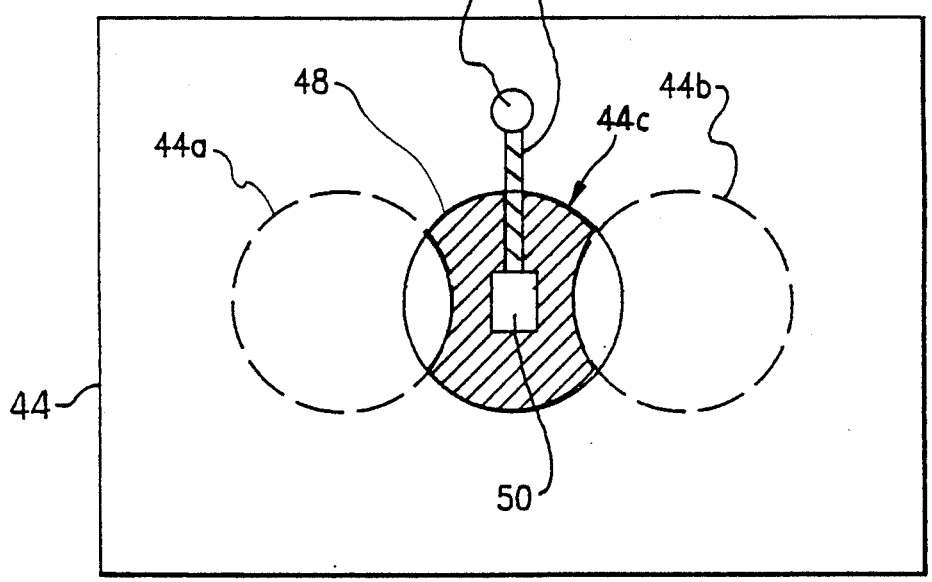
FIG. 5 is a plan view illustrating a sensor element of the structure of FIG. 4.

FIGS. 4 and 5 illustrate another sensor element configuration which may be embodied in accordance with the present invention. A structure 40 includes sheets 42, 44, and 46. Holes 42a and 46a are formed through the sheets 42 and 46 respectively in a manner similar to the embodiment of FIGS. 1 and 2. Two spaced holes 44a and 44b are formed through the sheet 44. When the sheets are laminated together as shown in FIG. 5, the holes 42a and 46a overlap inner portions of the holes 44a and 44b. A portion 44c of the sheet 44 between the holes 44a and 44b constitutes a sensor element in the form of a microbridge 48, having an inwardly tapered shape supported at the wide ends thereof. A sensor means such as a piezoresistor 50 is formed on the microbridge 48 for converting induced stress into an electrical signal. The microbridge 48 may be considered as a type of diaphragm supported at two opposite sides thereof. Further illustrated is a metallization strip 52 leading to a via 54.

Figure 6:
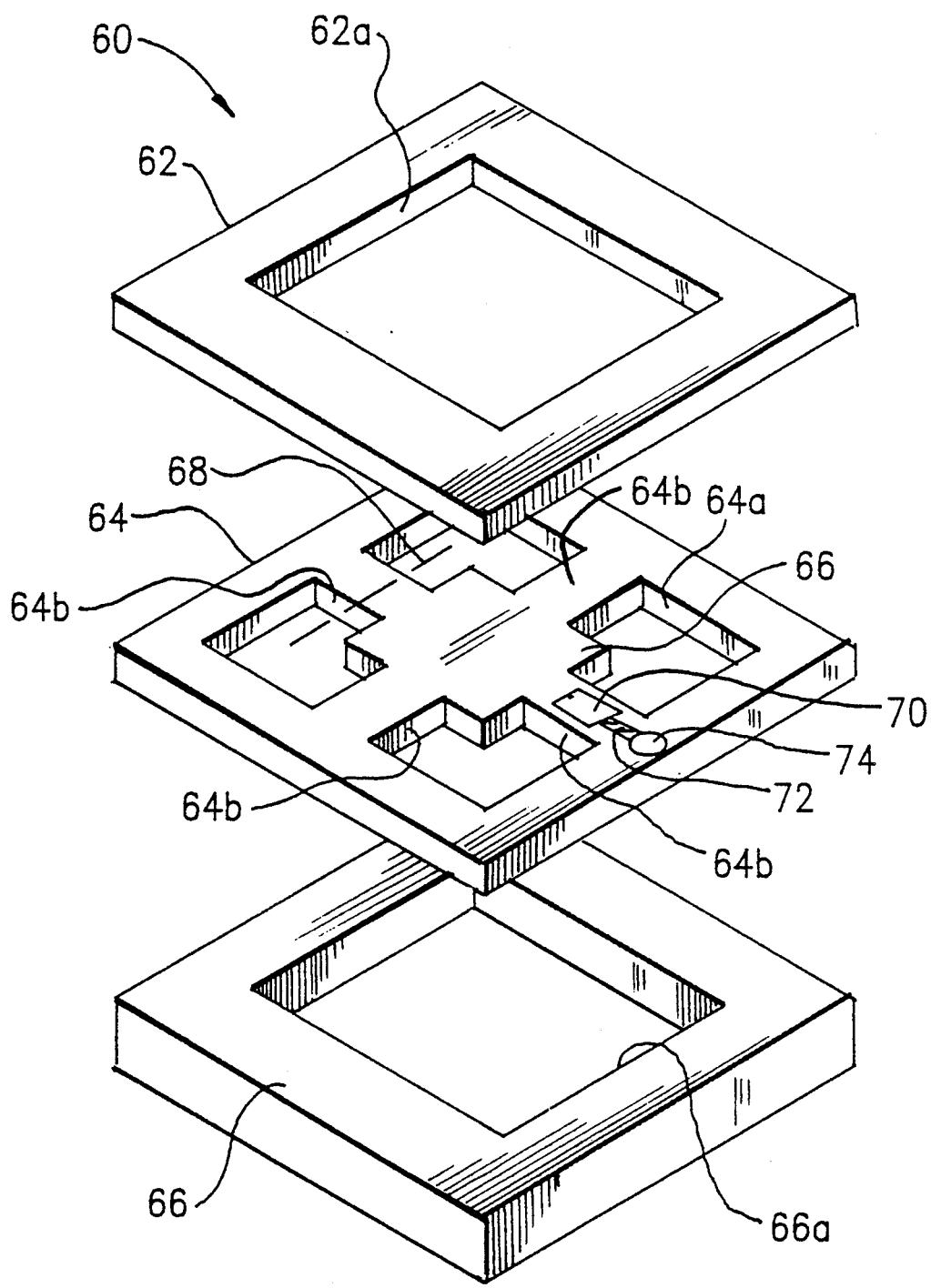
FIG. 6 is an exploded perspective view of another structure embodying the invention.

FIG. 6 illustrates another sensor element configuration embodying the present invention. A structure 60 includes sheets 62, 64, and 66. Relatively large rectangular holes 62a and 66a are cut through the sheets 62 and 66 respectively. A generally rectangular hole 64a is cut through the sheet 64. The holes 62a, 64a, and 66a need not necessarily be the same size.

A rectangular diaphragm in the form of an island 66, which is smaller than the holes 62a, 64a, and 66a, is formed in the sheet 64 to constitute a sensor element. The sides of the island 66 are connected to the adjacent outer portions of the sheet 64 by web portions 64b, which are shorter than the respective sides. If desired, the displacement of the island 66 in response to applied force may be increased by cutting one or more of the web portions 64b, as indicated at 68. A piezoresistor 70, metallization strip 72, and via 74 are shown as being attached to one of the web portions 64b. It is within the scope of the invention to provide any suitable sensing means on at least one of the web portions 64b, on the island 66, or at any other desired location.

Figure 7:
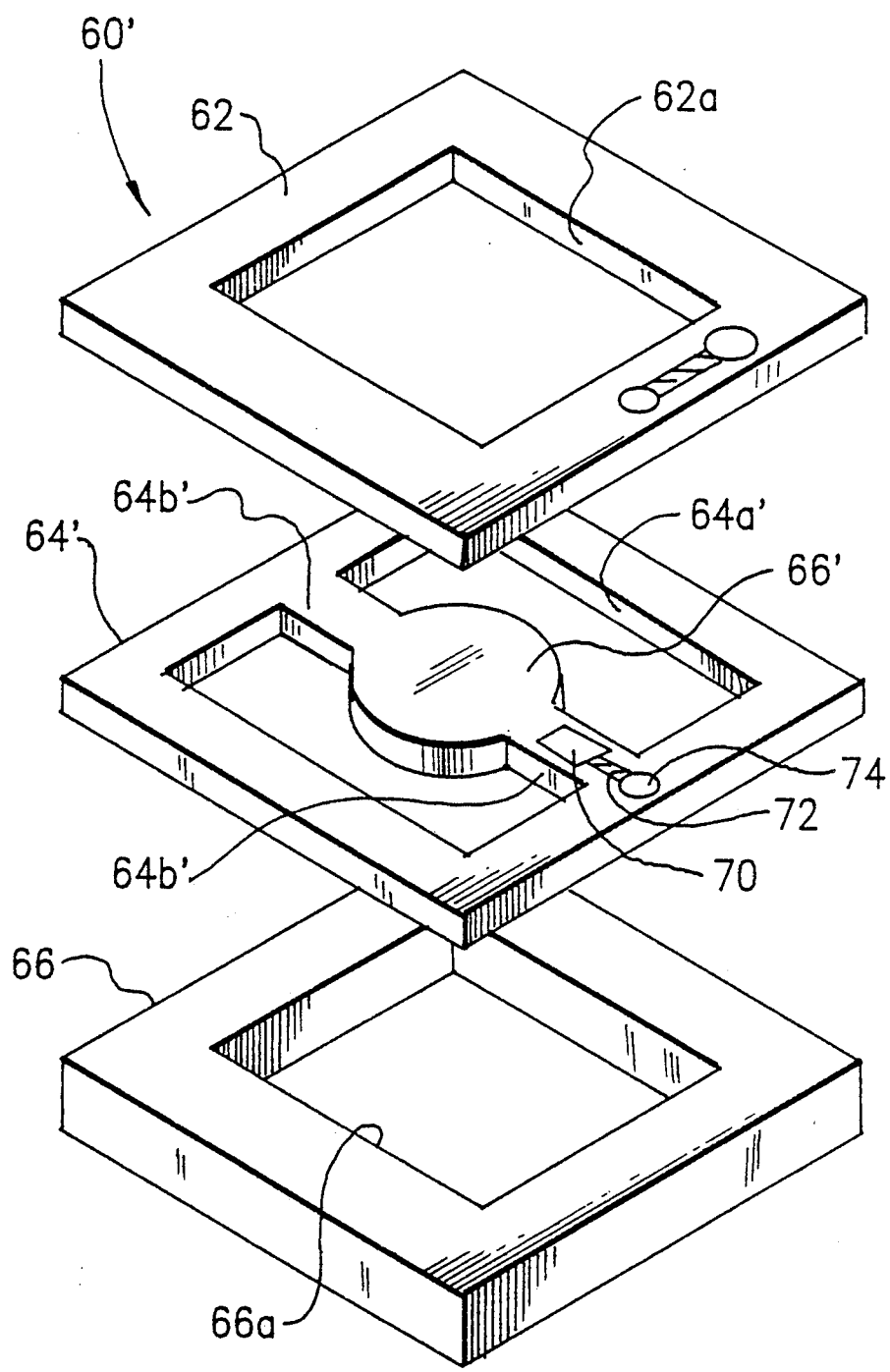
FIG. 7 is similar to FIG. 6, showing a modification of the illustrated structure.

Whereas the island 66 illustrated in FIG. 6 is rectangular and supported at four sides thereof, other island configurations are possible within the scope of the invention. The sides and corners of the rectangular shape may be rounded to any desired extent, and may ultimately form an oblong or circular shape. A structure 60' illustrated in FIG. 7 is similar to the structure 60 of FIG. 6, with like elements being designated by the same reference numerals, and like but modified elements designated by the same reference numerals primed. The island 66' differs from the island 66 in that the rectangular shape has been rounded into a circular shape. Whereas the island 66 is supported at four sides thereof, the island 66' is supported at only two opposite sides.

Figure 8:
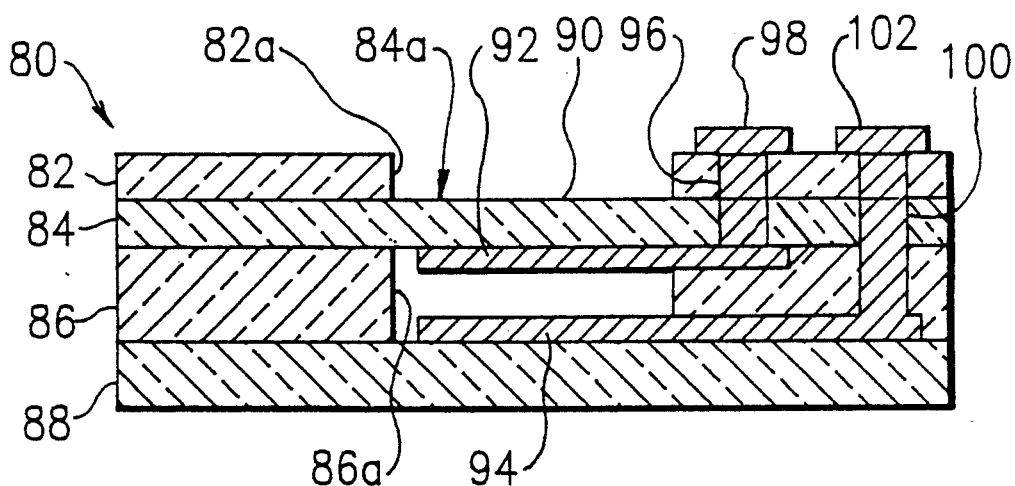
FIGS. 8 to 10 are sectional views illustrating additional embodiments of the invention.
Figure 9:
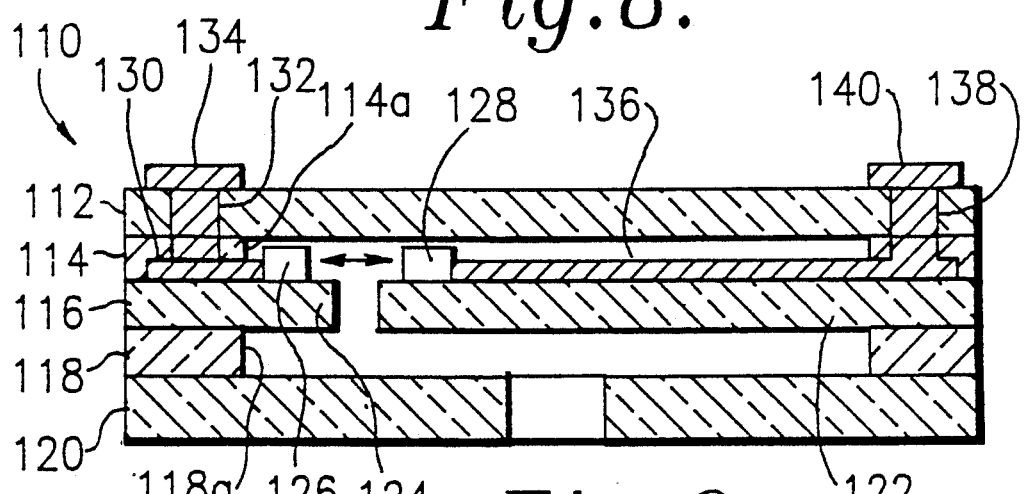

The embodiments of the invention described and illustrated thus far have utilized a piezoresistor as a means for sensing stress or displacement of the sensor element. FIGS. 8 and 9 illustrate alternative sensing or transducing means operating on different scientific principles.

A structure 80 illustrated in FIG. 8 includes sheets 82, 84, 86, and 88. Holes 82a and 86a are formed through the sheets 82 and 86 respectively. The space defined by the hole 86a is hermetically sealed by the sheets 84 and 88. A sensor element in the form of a circular diaphragm 90 is constituted by a central part 84a of the sheet 84, and exposed to the ambient environment through the hole 82a.

An electrically conductive member in the form of a metallization 92 is formed by screen printing, deposition, or the like on the lower surface of the diaphragm 90. Another electrically conductive member in the form of a metallization 94 is formed on the upper surface of the sheet 88. The metallizations 92 and 94 constitute plates of a variable capacitor, the capacitance of which varies in accordance with displacement of the diaphragm 90, which causes the metallization 92 to move toward and away from the metallization 94. The capacitance increases as the separation between the metallizations 92 and 94 decreases, and vice-versa. A via 96 and contact pad 98 are illustrated as being connected to the metallization 92, and a via 100 and contact pad 102 are connected to the metallization 94.

FIG. 9 illustrates a structure 110 which includes sheets 112, 114, 116, 118, and 120. Holes 114a and 118a are formed through the sheets 114 and 118 respectively. The sheet 116 is cut in such a manner as to provide a sensor element in the form of a movable arm 122. The arm 122 may be a cantilever beam as shown in FIG. 3, a web portion 64b cut at 68 as shown in FIG. 6, or have any other desired configuration. The sheet 116 is further cut to provide a support portion 124 which faces the end of the arm 122. The arm 122 is movable relative to the support portion 124 in response to applied force.

A light source 126, which may be a light emitting diode, laser diode, or the like, is attached to the support portion 124. A photodetector 128, which may be a photoelectric cell, photodiode, phototransistor, or the like, is attached to the end of the arm 122. The relative positions of the light source 126 and photodetector 128 may be reversed to produce an equivalent result. In either case, the photodetector 128 is arranged to be illuminated by light from the light source 126, in such a manner that the amount of light incident on the photodetector 128 varies in accordance with the displacement of the arm 122. Further illustrated in FIG. 9 are a metallization strip 130, via 132, and contact pad 134 interconnected with the light source 126, and a metallization strip 136, via 138, and contact pad 140 interconnected with the photodetector 128.

Although the capacitance and photoelectric sensor arrangements of FIGS. 8 and 9 are shown as being associated with a sensor element in the form of a circular diaphragm and cantilever arm respectively, they may be applied to any of the other sensor element configurations in accordance with the present invention.

LTCC tape is manufactured with very close thickness tolerance, and thereby automatically provides precise and reproducible control of thickness and mechanical properties of the sensor elements formed in accordance with the invention. The tape is typically available in thicknesses ranging from 114 to 317 microns, with a thickness tolerance of 7.5 microns.

Figure 10:
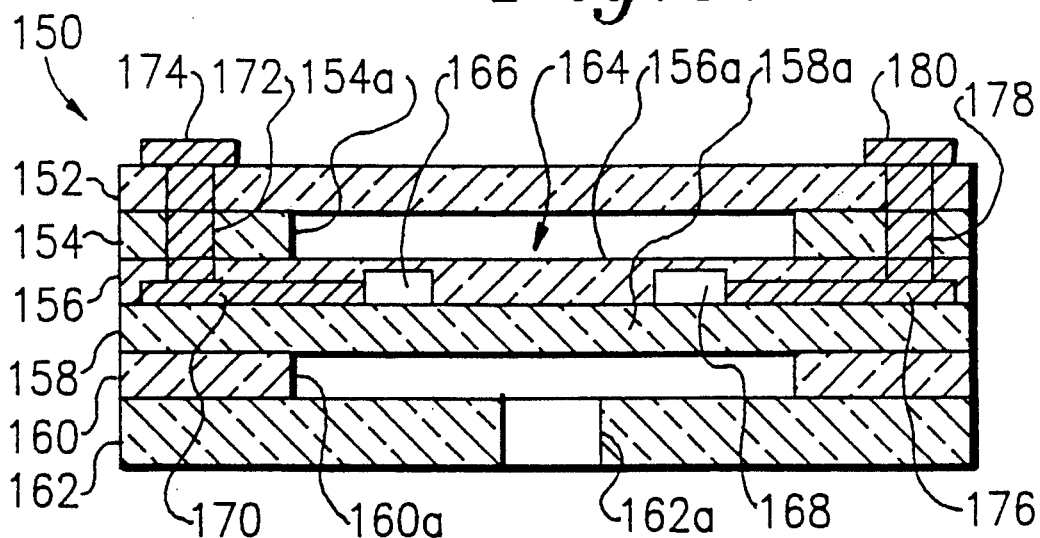

FIG. 10 illustrates how a sensor element which is thicker than one sheet may be constituted by integrally connected parts of two or more sheets. A structure 150 includes sheets 152, 154, 156, 158, 160, and 162. The sheet 162 may be a substrate as in the embodiment of FIGS. 1 and 2. Holes 154a, 160a, and 162a are formed through the sheets 154, 160, and 162 respectively. Central parts 156a and 158a of the sheets 156 and 158 respectively which are laminated together constitute, in combination, a sensor element in the form of a circular diaphragm 164. Sensing means, which may be piezoresistors 166 and 168, are buried between the parts 156a and 158a of the diaphragm 164, in such a manner that displacement of the diaphragm 164 produces a corresponding electrical signal output from the piezoresistors 166 and 168 in a manner similar to that described above. Further illustrated are a metallization strip 170, a via 172, and contact pad 174 interconnected with the piezoresistor 166, and a metallization strip 176, via 178, and contact pad 180 interconnected with the piezoresistor 168.

Various alternative sensor arrangements are possible within the scope of the invention. For example, the piezoresistor in any of the illustrated configurations may be replaced by a magnetoresistor. In this case, a permanent magnet (not shown) would be mounted at an appropriate location to produce a fixed magnetic field which encompasses the magnetoresistor. Deflection of the sensor element would result in movement of the magnetoresistor relative to the magnet, causing a variation in the magnetic flux in the magnetoresistor and a corresponding variation in the electrical resistance thereof. Another alternative sensor arrangement would include a glass fiber waveguide (not shown) spanning, for example, the microbridge illustrated in FIGS. 4 and 5. A light source and photodetector would be mounted at opposite ends of the waveguide, whereby the intensity of light received by the photodetector would vary in accordance with the displacement of the microbridge.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. A method for fabricating a sensor structure comprising the steps of:
   (a) providing a plurality of ceramic sheets, with at least one of said sheets being a thermally fusible ceramic tape sheet;
   (b) configuring said fusible ceramic tape sheet so that at least one part thereof constitutes a sensor element;
   (c) laminating the sheets together so that said fusible tape sheet has at least one of said ceramic sheets positioned above or positioned beneath it;
   (d) heating the laminated structure to fuse the sheets into a sintered unitary ceramic structure;
   the method further including between steps (a) and step (c), the steps of:
   (e) attaching sensing means to the sensor element for producing an electrical signal in response to a physical, electrical or chemical change in the sensor element, and
   (f) forming a metallization pattern of at least one electrically conductive member on at least one selected ceramic sheet other than said fusible ceramic tape sheet, said conductive member being configured to make electrical contact with said sensor element on said fusible tape sheet and to pass the electrical signal from said sensor element to one or more interconnect pads on the peripheral surface of said laminated ceramic structures.

2. A method as in claim 1, in which the thermally fusible tape sheet provided in step (a) is in the form of a glass-ceramic tape sheet.

3. A method as in claim 1, in which the thermally fusible tape sheet provided in step (a) is in the form of a transfer tape sheet, and step (a) further comprises providing a second one of said ceramic sheets in the form of a substantially rigid substrate for said sintered ceramic tape structure.

4. A method as claimed in claim 3, in which in step (a) all of said ceramic sheets are transfer tape and in step (d), the laminated structure is formed by laminating and fusing one or more layers at a time until the finished laminate is formed.

5. A method as in claim 1, further comprising the step, performed prior to step (c), of:
   (g) forming a hole through at least one of said top and/or bottom ceramic sheets;
   with step (c) including positioning the hole so that is aligned with and exposes the sensor element in the finished laminate to an ambient environment which is to be sensed.

6. A method as in claim 5, in which step (b) further comprises forming the sensor element into a cantilever shape.

7. A method as in claim 5, in which step (b) further comprises forming the sensor element into a substantially circular diaphragm.

8. A method as in claim 5, in which step (b) further comprises forming the sensor element into a substantially rectangular diaphragm having at least two sides thereof supported by the tape sheet.

9. A method as in claim 5, in which step (b) further comprises forming the sensor element into a substantially rectangular diaphragm which is smaller than the hole, and forming support portions extending between portions of the tape sheet external of the hole and at least two sides of the diaphragm respectively, the support portions being shorter than the sides.

10. A method as in claim 9, in which step (b) further comprises forming the support portions extending between two portions of the tape sheet external of the hole and two opposite sides of the diaphragm respectively.

11. A method as in claim 5, in which step (b) further comprises forming two spaced holes through the tape sheet, such that the sensor element includes a bridge portion of the tape sheet between the two holes.

12. A method as claimed in claim 5, in which step (g), holes are formed on both sides of said fusible ceramic tape sheet, and in step (c), both holes are positioned to be aligned with and expose said sensor element.

13. A method as in claim 1, in which step (e) further comprises attaching a piezoelectric element to the sensor element which is responsive to stress in the sensor element.

14. A method as in claim 1, in which step (e) further comprises attaching a second electrically conductive member to a selected one of said sheets; and step (c) includes aligning said second conductive member on said second selected sheet with the tape sheet in such a manner that the capacitance between the first and second conductive members will vary in accordance with the displacement of the sensor element.

15. A method for fabricating a sensor structure comprising the steps of:
   (a) providing a plurality of ceramic sheets, with at least one of said sheets being a thermally fusible ceramic tape sheet;
   (b) configuring said fusible ceramic tape sheet so that at least one part thereof constitutes a sensor element;
   (c) laminating the sheets together so that said fusible tape sheet has at least one of said ceramic sheets position above it or positioned below it
   (d) heating the laminated structure to fuse the sheets into a sintered unitary ceramic structure; and
   (e) attaching one of a light source and a photodetector to the sensor element and attaching the other of the light source and photodetector to one of said ceramic sheets other than said fusible tape sheet, the light source and photodetector being aligned in such a manner that the amount of light from the light source incident on the photodetector varies in accordance with the displacement of the sensor element.

16. A method as in claim 1, in which:

step (a) includes providing at least a second one of said sheets in the form of a thermally fusible ceramic tape sheet;

step (b) includes configuring the second sheet so that the sensor element further includes a part of the second tape sheet; and step (c) includes aligning said tape sheet, the second tape sheet, and the sensing means, in such a manner that said parts of said tape sheet and the second tape sheet respectively are laminated together with the sensing means buried therebetween.

17. A method as in claim 16, in which step (e) comprises providing the sensing means in the form of a piezoelectric element.

18. A method as in claim 1, in which step (e) is performed between steps (b) and (c).

19. A method as in claim 1, in which step (e) is performed after step (d).

20. A method as claimed in claim 1, in which in step (a), all of said ceramic sheets comprise low temperature cofired ceramic tapes, and in step (d), the laminated structure is cofired as a unit.

21. A method as claimed in claim 1, in which in step (e), said sensor means comprises one or more piezoresistors.

22. A method as claimed in claim 1, in which in step (e), said sensor means comprises one or more magnetoresistors.

23. A method as claimed in claim 1, in which in steps (b) and (e), the sensor element sensor means are hermetically sealed.

24. A method as claimed in claim 2, in which in step (c), said fusible tape has at least one of said ceramic sheets positioned above it and at least one of said ceramic sheets positioned below it.

25. A method for baricating a sensor structure comprising the steps of:

(a) providing a plurality of low temperature cofired ceramic (LTCC) sheets; p1 (b) configuring at least one of said ceramic sheets so that a part thereof constitutes a sensor element;

(c) attaching sensing means to said element to produce an electric signal in response to a physical, chemical or electrical change in said sensor element;

(d) forming a first metallization pattern on at least one of said LTCC sheets, said pattern leading to an interconnect pad at the outer edge of said metallized sheet;

(e) forming at least one hole through at least a second one of said LTCC sheets other than the sheet containing said sensing means;

(f) laminating said sheets so that the sensor element has at least one of said LTCC sheets positioned above and at least one of said LTCC sheet positioned below, with said metallized pattern being positioned to interconnect with said sensing means to conduct said electric signal to said interconnect pad; and said hole is positioned to expose the sensor element to the ambient environment which is to be sensed; and (g) cofiring the laminated sheets to fuse them into a single, unitary ceramic structure.

26. A method as in claim 25, in which step (d) further comprises attaching a second electrically conductive member to a second one of said LTCC sheets and step (f) includes positioning said second conductive member in the laminated structure so that the second conductive member is aligned with the first conductive member in such a manner that the capacitance between the first and second conductive members will vary in accordance with the displacement of the sensor element.

27. A method as claimed in claim 25, in which in step (e), holes are formed on both sides of said fusible ceramic tape sheets, and in step (f), both holes are positioned to be aligned with and expose said sensor element.

* * * * *